US010378497B2

(12) United States Patent
Schaad et al.

(10) Patent No.: US 10,378,497 B2
(45) Date of Patent: Aug. 13, 2019

(54) VALVE FOR METERING A FLUID

(71) Applicant: Robert Bosch GmbH, Stuttgart (DE)

(72) Inventors: Andreas Schaad, Maulbronn (DE); Joerg Abel, Gerlingen (DE); Juergen Maier, Ottmarsheim (DE); Martin Buehner, Backnang (DE); Matthias Boee, Ludwigsburg (DE); Olaf Schoenrock, Stuttgart-Weilimdorf (DE); Philipp Rogler, Stuttgart (DE); Stefan Cerny, Bietigheim-Bissingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/741,835

(22) PCT Filed: Jul. 5, 2016

(86) PCT No.: PCT/EP2016/065815

§ 371 (c)(1),
(2) Date: Jan. 4, 2018

(87) PCT Pub. No.: WO2017/009103

PCT Pub. Date: Jan. 19, 2017

(65) Prior Publication Data

US 2018/0209388 A1 Jul. 26, 2018

(30) Foreign Application Priority Data

Jul. 15, 2015 (DE) ........................ 10 2015 213 216

(51) Int. Cl.
*F02M 51/06* (2006.01)
*F02M 63/00* (2006.01)
*F16K 31/06* (2006.01)

(52) U.S. Cl.
CPC ...... *F02M 51/066* (2013.01); *F02M 51/0685* (2013.01); *F02M 63/0022* (2013.01); (Continued)

(58) Field of Classification Search
CPC ............. F02M 51/066; F02M 51/0685; F02M 2200/304; F02M 63/0022; F16K 31/0665; F16K 31/0689
See application file for complete search history.

(56) References Cited

U.S. PATENT DOCUMENTS 3,725,747 A * 4/1973 Cowan ...................... H01F 7/13 361/154
2003/0146400 A1 * 8/2003 Mueller ............. F02M 51/0685 251/48

(Continued)

FOREIGN PATENT DOCUMENTS

DE 10360330 A1 7/2005
DE 102010003958 A1 10/2011

(Continued)

OTHER PUBLICATIONS

International Search Report dated Oct. 6, 2016 of the corresponding International Application PCT/EP2016/065815 filed Jul. 5, 2016.

*Primary Examiner* — Jacob M Amick
*Assistant Examiner* — Charles Brauch
(74) *Attorney, Agent, or Firm* — Norton Rose Fulbright US LLP; Gerard Messina

(57) ABSTRACT

A fluid metering valve includes a housing, an electromagnetic actuator that includes an armature that is separated from an inner wall of the housing by an annular gap, a throttle element connected to the armature or the housing and arranged in the annular gap to dampen a movement of the armature that is opposite to an opening direction, a valve seat surface, a valve closing body that cooperates with the valve seat surface to form a sealing seat, and a valve needle that (a) is actuatable by the actuator, (b) is arranged for actuating the valve closing body (c) extends through a borehole in the armature so that the armature is movably guidable on the valve needle, and (d) includes a stop arranged such that, during an actuation, the armature strikes against the stop in the opening direction to thereby open the sealing seat.

13 Claims, 3 Drawing Sheets

(52) U.S. Cl.
CPC ...... *F16K 31/0665* (2013.01); *F16K 31/0689* (2013.01); *F02M 2200/304* (2013.01)

(56) References Cited

U.S. PATENT DOCUMENTS

| | | | | | |
|---|---|---|---|---|---|
| 2005/0001183 | A1* | 1/2005 | Hironaka | ................ | B60T 8/363<br>251/50 |
| 2013/0214057 | A1* | 8/2013 | Doehring | ................ | F01N 3/206<br>239/68 |

FOREIGN PATENT DOCUMENTS

| | | | |
|---|---|---|---|
| DE | 102011087895 | A1 | 6/2013 |
| JP | 2003328891 | A | 11/2003 |
| JP | 2010229997 | A | 10/2010 |
| JP | 2010539379 | A | 12/2010 |
| JP | 2012097704 | A | 5/2012 |
| JP | 2013064414 | A | 4/2013 |
| JP | 2015519514 | A | 7/2015 |
| WO | 0144654 | A2 | 6/2001 |
| WO | 2004051073 | A1 | 6/2004 |
| WO | 2014048609 | A1 | 4/2014 |

* cited by examiner

VALVE FOR METERING A FLUID

CROSS-REFERENCE TO RELATED APPLICATIONS

The present application is the national stage of International Pat. App. No. PCT/EP2016/065815 filed Jul. 5, 2016, and claims priority under 35 U.S.C. § 119 to DE 10 2015 213 216.1, filed in the Federal Republic of Germany on Jul. 15, 2015, the content of each of which are incorporated herein by reference in their entireties.

FIELD OF THE INVENTION

The present invention relates to a valve for metering a fluid, in particular a fuel injector for internal combustion engines. In particular, the present invention relates to the field of injectors for fuel injection systems of motor vehicles, in which preferably a direct injection of fuel into combustion chambers of an internal combustion engine takes place.

BACKGROUND

A fuel injector is known from DE 103 60 330 A1 which is used in particular for fuel injection systems of internal combustion engines. The known fuel injector includes a valve needle that cooperates with a valve seat surface to form a sealing seat, and an armature that is connected to the valve needle, and that is acted on by a return spring in a closing direction and cooperates with a solenoid. The armature is situated in a recess in an external pole of the magnetic circuit, and includes a collar that is provided around the circumference of the armature. The collar has a triangular cross section. Directionally dependent hydraulic damping of the armature is possible due to the shape of the collar, resulting in damping of the opening movement. In contrast, a virtually unhindered flow of fuel results during the closing movement, so that there is preferably little adhesion of the armature to the internal pole, and the fuel injector may be quickly closed.

SUMMARY

The valve according to the present invention has the advantage that an improved design and functionality are made possible. In particular, improved multiple injection capability with short pause times can be achieved with a design having an armature free travel path.

In the valve for metering the fluid, the armature, which is used as a solenoid armature, is not fixedly connected to the valve needle, but instead is freely suspended between stops. Such stops can be implemented by stop sleeves and/or stop rings. The armature in the neutral state is moved, via a return spring, against a stop that is stationary with respect to the valve needle, so that the armature rests there. During the control of the valve, the entire armature free travel path is then available as an acceleration path.

Compared to a fixed connection of the armature to the valve needle, this results in the advantage that, due to the resulting pulse of the armature during opening, with the same magnetic force, the valve needle can be reliably opened, also at higher pressures, in particular fuel pressures. This may be referred to as dynamic mechanical reinforcement. Another advantage is that decoupling of the involved masses takes place, so that the resulting stop forces on the sealing seat are split into two pulses.

However, specific problems arise that are associated with the free suspension of the armature on the valve needle. When the valve closes, the problem arises that, for design-related reasons, the armature may bounce back after striking the stop in question, so that in the extreme case the entire armature free travel path may be traversed again, and the next time the armature strikes against the oppositely situated stop, the armature still has so much energy that the valve needle is briefly lifted from its seat once again. An inadvertent post-injection may thus occur, resulting in increased fuel consumption and possibly increased pollutant emissions. Even if the armature does not traverse the entire armature free travel path when it bounces back, it may take some time before the armature is calmed and returns into the starting position. If re-actuation now takes place before the final calming, which is important in particular for multiple injections with short pause times between multiple injections, this does not result in a robust valve function. For example, the stop pulses may correspondingly increase or decrease, which in the worst case may result in the valve no longer opening at all, since the stop pulse is no longer large enough for this purpose.

Due to the throttle element of the present invention, it is advantageously possible to prevent or at least reduce the armature bounce. A more robust multiple injection capability with short pause times can be achieved as a result. In addition, smaller stop pulses can be achieved during closing, which reduces the wear on the armature and the stops, and also on the valve seat. There are also fewer changes in functioning over the service life of the valve. In addition, a reduction in noise is achieved.

One or more of the following advantages can thus be achieved, depending on the design of the valve. Improved damping during the overall suspension phase of the armature can be achieved, which can relate to the needle lift and the armature free travel path. This results in a reduced stop pulse during closing of the valve when the valve closing body strikes against the valve seat surface. In addition, a low rebound height can be achieved, which avoids armature bounce. In particular, inadvertent post-injections can be prevented in this way. Furthermore, quicker calming of the armature can be achieved, which allows improved behavior during multiple injections.

The valve closing body that is actuated by the valve needle can be designed in one piece with the valve needle. The valve closing body cab be designed as a spherical valve closing body, or may have some other design.

According to an example embodiment, the throttle element is inserted in a ring-shaped recess formed on the outer side of the armature, which can provide the advantage that a form-fit connection of the throttle element to the armature can be achieved. The flow around the armature can be influenced in a targeted manner via the selection of the throttle element.

Correspondingly, according to an alternative example embodiment, the throttle element is inserted in a ring-shaped recess formed in the inner wall of the housing part, which cap provide the advantage of a form-fit connection between the throttle element and the housing part. A favorable influence on the flow around the armature is likewise possible via the selection of the throttle element.

According to an example embodiment, the throttle element is designed as a piston ring, which can provide the advantage of a robust design and the advantage of a uniform flow around the armature.

According to an example embodiment, the throttle element is at least partially metallic and/or is partially plastic, providing the advantage that, depending on the particular application, a sufficiently robust and possibly cost-effective design is possible. In particular, the manufacture of the armature can take place in a cost-effective manner and largely independently from the throttle element when the throttle element is designed as a separate ring, in particular a piston ring. An adaptation to the particular application is then possible via the selection of the throttle element. This results in improved properties with low overall costs.

According to an example embodiment, that can provide the advantage of wear- and noise-optimized damping, the throttle element is configured with respect to the inner wall of the housing part or the outer side of the armature n such a way that a frictionless relative movement between the throttle element and the inner wall of the housing part or the outer side of the armature is ensured.

According to an example embodiment, that can provide the advantage that the damping effect can be specified to be particularly great and that the damping is optionally increased by an appropriately large friction force, the throttle element is configured with respect to the inner wall of the housing part or the outer side of the armature in such a way that, at least during the actuation of the armature in the direction opposite the opening direction, a friction force occurs between the throttle element and the inner wall of the housing part or the outer side of the armature.

According to an example embodiment, the throttle element is designed at least in part as an elastically deformable diaphragm which, during a movement of the armature in the opening direction, allows a greater flow through the annular gap than during a corresponding movement of the armature opposite the opening direction. This embodiment can provide the advantage that a great damping effect can be achieved which is also controlled in a directionally dependent manner, since the elastic diaphragm can have a blocking or opening action, depending on the movement direction.

According to an example embodiment, the throttle element blocks the flow through the annular gap during a movement of the armature opposite the opening direction, and/or at least one continuous throttle bore is provided in the armature which allows a throttled flow through the armature. This embodiment can provide the advantage particularly high damping can be achieved by blocking the flow around the armature opposite the opening direction. Coordination of the throttled flow and thus of the damping is possible via the design of the continuous throttle bores of the armature.

According to an example embodiment, a return spring is provided which acts on the armature to move the armature, with respect to the valve needle, opposite the opening direction into a starting position, and the throttle element and the return spring are coordinated in such a way that the armature at least essentially returns into the starting position between two successive actuations. This embodiment can provide the advantage that coordination is possible which allows a robust mode of operation, depending on the particular application, in particular desired multiple injections.

Preferred exemplary embodiments of the present invention are explained in greater detail in the following description with reference to the appended drawings, in which corresponding elements are provided with the same reference numerals.

DETAILED DESCRIPTION

Figure 1:
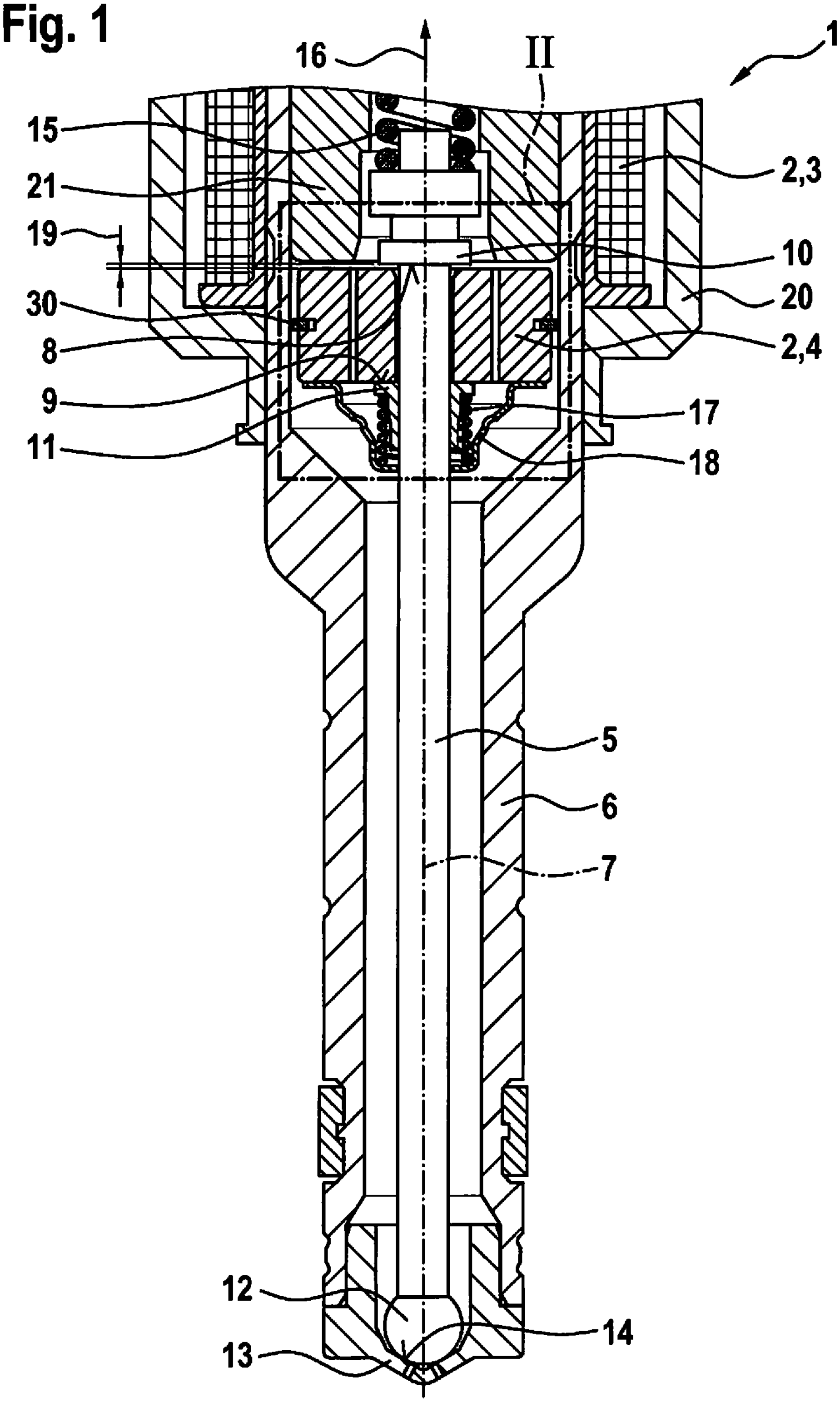
FIG. 1 shows a valve in a partial schematic sectional illustration corresponding to a first exemplary embodiment of the present invention.

FIG. 1 shows a valve 1 for metering a fluid in a partial schematic sectional illustration corresponding to a first exemplary embodiment. Valve 1 can be designed in particular as a fuel injector 1. One preferred application is a fuel injection system in which such fuel injectors 1 are designed as high-pressure injectors 1 and used for direct injection of fuel into associated combustion chambers of the internal combustion engine. Liquid or gaseous fuels can be used as fuel.

Valve 1 includes an actuator 2 that includes a solenoid 3 and an armature 4. A magnetic circuit is closed by energizing solenoid 3, resulting in an actuation of armature 4. Via armature 4, it is in turn possible to actuate a valve needle 5 that extends through a nozzle body 6 and is guided along a longitudinal axis 7 of nozzle body 6. The cooperation of armature 4 with valve needle 5 takes place in such a way that a relative movement of armature 4 relative to valve needle 5 between stops 8, 9 is made possible. In this exemplary embodiment, stop 8 is formed on a collar 10 of valve needle 5. Stop 9 is formed on a stop ring 11 that rests on valve needle 5. Stop 8 which is relevant for opening valve 1 in this exemplary embodiment is stationary with respect to valve needle 5.

Valve 1 includes a valve closing body 12 that is actuatable by valve needle 5. In this exemplary embodiment, valve closing body 12 is designed as a spherical valve closing body 12. In addition, valve 1 includes a valve seat body 13 on which a valve seat surface 14 is formed. A sealing seat is formed between valve closing body 12 and valve seat surface 14.

Valve needle 5 is acted on by a valve spring 15 in the direction opposite an opening direction 16. In addition, a return spring 17 that is supported on stop ring 11 is provided, which acts on an armature sleeve 18 that is connected to armature 4, in order to move armature 4 into a starting position in which armature 4 rests against stop 9 when solenoid 3 is not energized.

In the starting position, this results in a certain distance 19 between armature 4 and stop 8 on collar 10, which allows an armature free travel path 19.

Solenoid 3 is energized to actuate valve 1. The magnetic circuit is closed via a housing part 20, nozzle body 6, armature 4, and a pole body 21, as the result of which armature 4 is displaced in the direction of pole body 21. Armature 4 traverses armature free travel path 19 before the sealing seat between valve closing body 12 and valve seat surface 14 is opened. This allows dynamic reinforcement, resulting in a larger mechanical opening force when armature 4 strikes against stop 8, which is stationary with respect to valve needle 5, and valve needle 5 is hereby actuated. Armature 4 is therefore displaced into opening direction 16 in order to open valve 1.

Armature 4 is displaced in the direction opposite opening direction 16 when valve 1 is closed. After the sealing seat closes, armature 4 now traverses armature free travel path 19 in the reverse direction, i.e., opposite opening direction 16. Damping of the movement takes place at least during this movement of armature 4. When armature 4 strikes against stop ring 11, this prevents the armature from bouncing back and once again traversing armature free travel path 19 in opening direction 16.

A throttle element 30 is provided for damping the movement of armature 4. The design of valve 1 with throttle element 30 according to the first exemplary embodiment is described in greater detail below with reference to FIG. 2. Modified embodiments are described with reference to FIGS. 3 and 4.

Figure 2:
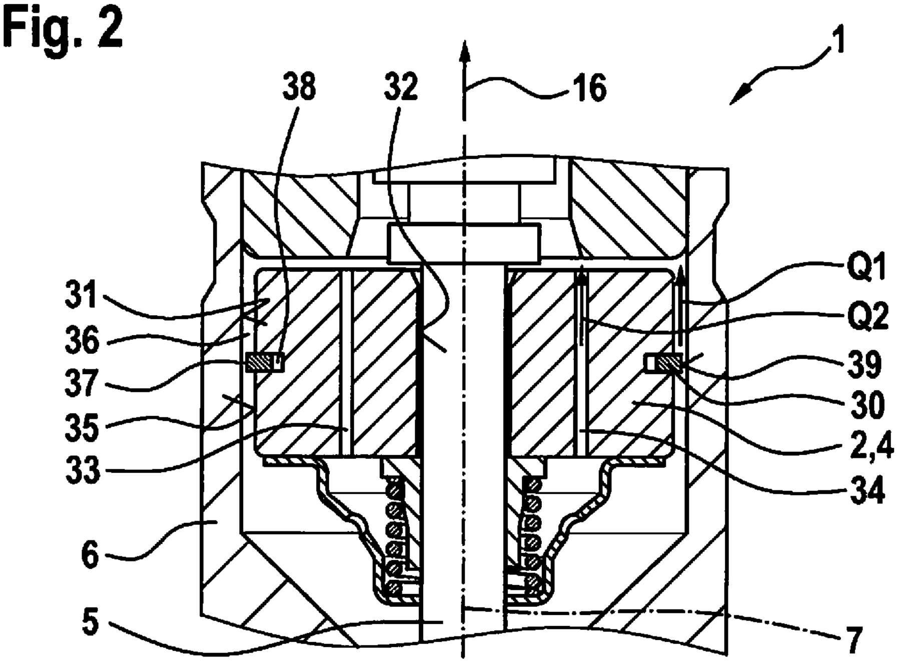
FIG. 2 shows the detail of the valve according to the first exemplary embodiment, in the section of FIG. 1 denoted by reference numeral II.

FIG. 2 shows the detail of valve 1 according to the first exemplary embodiment, denoted by reference numeral II in FIG. 1. Nozzle body 6 includes an inner wall 31. Nozzle body 6 is one possible design of a housing part 6 on which inner wall 31 is formed. Armature 4 is situated in the area of inner wall 31, and is movably mounted on valve needle 5. For this purpose, armature 4 includes a through borehole 32 through which valve needle 5 extends. In addition, armature 4 includes multiple continuous throttle bores 33, 34, it being possible to provide a suitable number of throttle bores 33, 34 around longitudinal axis 7 in armature 4, for example in a circumferential distribution.

An annular gap 36 is formed between inner wall 31 of nozzle body 6 and an outer side 35 of armature 4. A flow Q1 during a movement of armature 4 is made possible via annular gap 36. Similarly, a flow Q2 through armature 4 is made possible via throttle bores 33, 34.

Throttle element 30 entails a constriction 37 or bottleneck 37 in annular gap 36, as the result of which flow Q1 is throttled. In addition, through boreholes 33, 34 are designed in such a way that flow Q2 is throttled. The movement of armature 4 is thereby damped. In particular, a movement of armature 4 in the direction opposite opening direction 16 is damped. Stronger damping in a preferred direction, i.e., opposite opening direction 16, is achievable by a suitable design, for example as described with reference to FIG. 4. An adaptation with regard to a possibly desired one-way effective direction can thus take place.

In this exemplary embodiment, throttle element 30 is designed as a piston ring 30 which can be made of plastic or metal, for example. In this exemplary embodiment, a ring-shaped recess 38 into which throttle element 30 is inserted is formed in outer side 35 of armature 4. An outer side 39 of throttle element 30 is spaced apart from inner wall 31 of nozzle body 6. In one modified embodiment, throttle element 30 with its outer side 39 can also rest against inner wall 31, so that a frictional relative movement occurs during a movement of armature 4. The friction force thus generated during the actuation likewise results in a damping of the movement of armature 4.

Thus, depending on the particular application, either a largely friction-free relative movement between armature 4 and nozzle body 6 via throttle element 30, or a frictional relative movement with the aid of throttle element 30, can be achieved. Hydraulic coordination is possible via the number and design of throttle bores 33, 34.

The medium which is present in the area of armature 4 within housing part 6 and which is led through annular gap 36 and throttle bores 33, 34 is not necessarily the same as the fluid to be injected. Depending on the application, it is also possible in principle to use a suitable, separate hydraulic fluid or the like. This design, possible in principle, is achievable due to a suitable structural change from the shown design, in which a fuel flows through the area of armature 4.

During the movement of armature 4 in and opposite opening direction 16, in particular recirculation of the fluid or medium in question corresponding to flows Q1, Q2 can take place. The hydraulic damping, which is settable via the selected dimensioning, is thus possible. The movement of armature 4 can thus be damped in a targeted manner in order to reduce stop pulses, which can occur when valve closing body 12 strikes against valve seat surface 14 and/or armature 4 strikes against its stops 8, 9, and to bring armature 4 into its starting position (neutral position) more quickly after the control.

Figure 3:
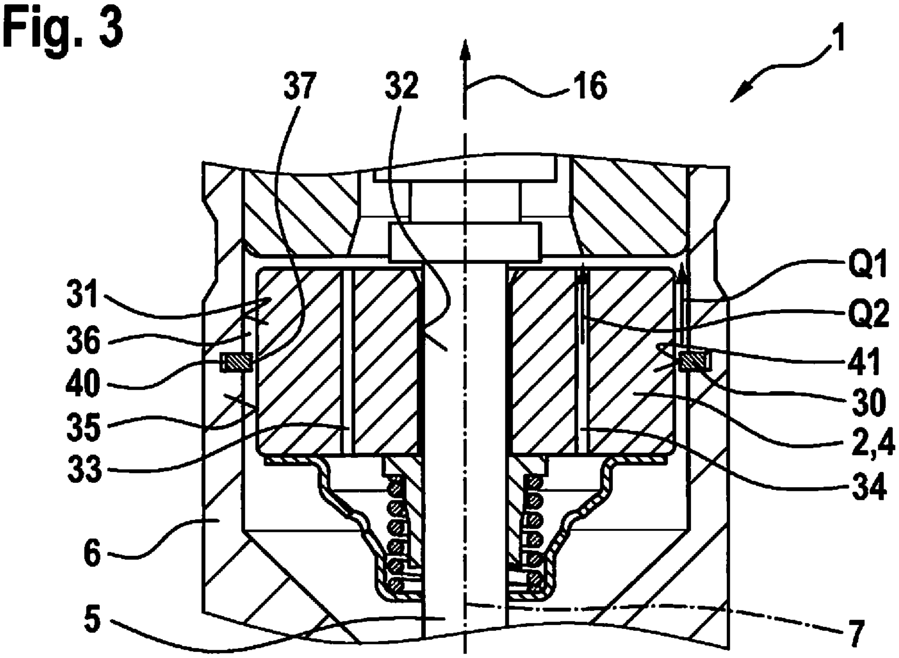
FIG. 3 shows the detail of the valve illustrated in FIG. 2 according to a second exemplary embodiment of the present invention.

FIG. 3 shows the detail of valve 1 illustrated in FIG. 2 according to a second exemplary embodiment. In this exemplary embodiment, a ring-shaped recess 40 into which throttle element 30, designed as a piston ring 30, is inserted is formed on inner wall 31 of nozzle body 6. In this exemplary embodiment, this results in constriction 37 of annular gap 36 between an inner side 41 of throttle element 30 and outer side 35 of armature 4. A friction-free relative movement between throttle element 30 and outer side 35 of armature 4 is thus possible.

In one modified embodiment, inner side 41 of throttle element 30 can also be guided up to outer side 35 of armature 4 in order to achieve a frictional relative movement between armature 4 and nozzle body 6 with the aid of throttle element 30. Additional damping can then be achieved via the friction force that results during an actuation of armature 4.

Figure 4:
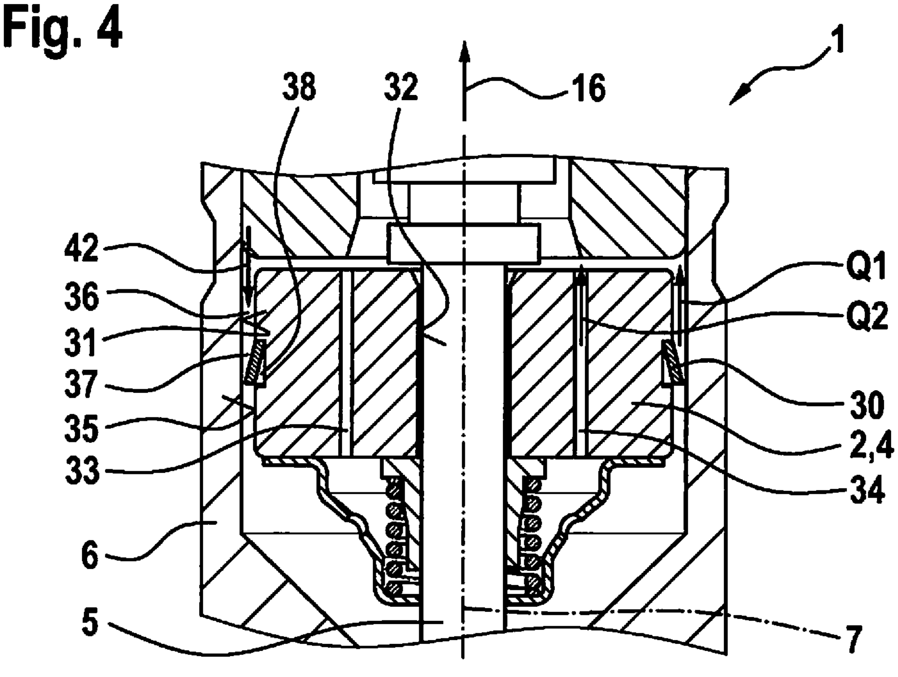
FIG. 4 shows the detail of the valve illustrated in FIG. 2 according to a third exemplary embodiment of the present invention.

FIG. 4 shows the detail of valve 1 according to a third exemplary embodiment, denoted by reference numeral II in FIG. 1. In this exemplary embodiment, throttle element 30 is designed as an elastically deformable diaphragm 30. Diaphragm 30 is connected to armature 4 in this exemplary embodiment. For this purpose, throttle element 30 can be inserted, for example, into a recess 38 on outer side 35 of armature 4. However, other connection options are also conceivable. In addition, in one modified embodiment, throttle element 30 which is designed as a diaphragm 30 can also be connected to nozzle body 6.

In this exemplary embodiment, throttle element 30 has a lesser throttling effect in a flow direction 42 than in the direction opposite flow direction 42. This is due to the fact that when the flow takes place in flow direction 42, diaphragm 30 is radially compressed in the direction of longitudinal axis 7, thus increasing the flow cross section at diaphragm 30. Conversely, a flow opposite to flow direction 42 results in a radial pressure on diaphragm 30, as the result of which the flow cross section is reduced, or, depending on the design, possibly disappears altogether. A movement of armature 4 in opening direction 16 corresponds to flow direction 42.

In this embodiment, throttle element 30 therefore has a mode of operation in which during a movement of armature 4 in opening direction 16, a greater flow Q1 through annular gap 36 is made possible than during a corresponding movement of armature 4 opposite to opening direction 16. The damping effect can thus be controlled in a directionally dependent manner, since elastic diaphragm 30 has a blocking or opening action, depending on the movement direction. Throttled flow Q2 may be coordinated, depending on the application, via the flow cross section that is made possible, independently of direction, through boreholes 32.

In the embodiments of valve 1, recess 38 can be provided on armature 4, or recess 40 can be provided on housing part 6 in the form of a ring-shaped circumferential groove 40. However, other embodiments are also conceivable. In addition, other options for connecting throttle element 30 to armature 4 or to housing part 6 are also possible. Furthermore, the design of the valve with two or more throttle elements 30 situated in annular gap 36 is also conceivable in order to achieve throttling of flow Q1. Moreover, throttle bores 33, 34 in armature 4 can also optionally be dispensed with, depending on the application.

The present invention is not limited to the described exemplary embodiments and modifications.

What is claimed is:

1. A valve for metering a fluid, comprising:

a housing;

an electromagnetic actuator that includes an armature, wherein an inner wall of the housing and an outer side of the armature are separated by an annular gap;

a throttle element connected to the armature or the housing and arranged in the annular gap to dampen a movement of the armature that is opposite to an opening direction;

a valve seat surface;

a valve closing body that cooperates with the valve seat surface to form a sealing seat; and a valve needle;

wherein the valve needle is actuatable by the actuator, wherein the valve needle is arranged for actuating the valve closing body, wherein the valve needle extends through a borehole in the armature so that the armature is movably guidable on the valve needle, and wherein the valve needle includes a stop arranged such that, during an actuation, the armature strikes against the stop in the opening direction to open the sealing seat;

wherein the armature includes multiple continuous throttle bores around a longitudinal axis in the armature, wherein the annular gap is formed between an inner wall of a nozzle body and an outer side of the armature, wherein a flow during a movement of the armature occurs via the annular gap and wherein another flow through the armature occurs via the throttle bores, and wherein the throttle element includes a constriction or a bottleneck in the annular gap, as a result of which the flow is throttled, and wherein the through boreholes are configured so that the another flow is throttled, so that the movement of the armature in a direction opposite an opening direction is damped.

2. The valve of claim 1, wherein the valve is of a fuel injector for an internal combustion engine.

3. The valve of claim 1, wherein the outer side of the armature includes a ring-shaped recess in which the throttle element is arranged.

4. The valve of claim 1, wherein the inner wall of the housing includes a ring-shaped recess in which the throttle element is arranged.

5. The valve of claim 1, wherein the throttle element is a piston ring.

6. The valve of claim 1, wherein the throttle element is at least partially made of a metallic material.

7. The valve of claim 1, wherein the throttle element is at least partially made of a plastic.

8. The valve of claim 1, wherein the throttle element is arranged for a frictionless movement of the throttle element relative to the inner wall of the housing or relative to the outer side of the armature.

9. The valve of claim 1, wherein the throttle element is arranged so that, during the movement of the armature that is opposite to the opening direction, a friction force occurs between the throttle element and the inner wall of the housing or the outer side of the armature.

10. The valve of claim 1, wherein the throttle element is at least in partially an elastically deformable diaphragm which, during a movement of the armature in the opening direction, allows a greater flow through the annular gap than during the movement of the armature that is opposite to the opening direction.

11. The valve of claim 10, wherein the throttle element blocks the flow through the annular gap during the movement of the armature that is opposite the opening direction.

12. The valve of claim 1, wherein the armature includes at least one continuous throttle bore that allows a throttled flow through the armature.

13. The valve of claim 1, further comprising:

a return spring that is arranged to move the armature relative to the valve needle opposite the opening direction into a starting position, and the throttle element and the return spring are coordinated such that the armature at least essentially returns into the starting position between two successive actuations.

* * * * *